United States Patent [19]
Billow et al.

[11] Patent Number: 5,234,330
[45] Date of Patent: Aug. 10, 1993

[54] DIES

[75] Inventors: Steven A. Billow, Rochester; Stephen T. Faulkenberry, Conesus; Thomas M. Laney, Spencerport, all of N.Y.

[73] Assignee: Eastman Kodak Company, Rochester, N.Y.

[21] Appl. No.: 715,208

[22] Filed: Jun. 14, 1991

[51] Int. Cl.⁵ .................... B29C 47/08; B29C 47/14
[52] U.S. Cl. .................... 425/190; 425/192 R; 425/461; 425/467
[58] Field of Search ............ 425/133.5, 190, 192 R, 425/376.1, 382.4, 461, 466, 467; 264/165, 176.1

[56] References Cited

U.S. PATENT DOCUMENTS

| | | | |
|---|---|---|---|
| 2,471,330 | 5/1949 | Knight et al. | 117/61 |
| 2,761,418 | 9/1956 | Russell | 118/410 |
| 2,923,971 | 2/1960 | Nelson | 425/466 |
| 2,982,995 | 5/1961 | Groleau | 18/12 |
| 3,241,183 | 3/1966 | Tyrner | 18/12 |
| 3,360,823 | 1/1968 | Tyrner | 18/12 |
| 3,397,428 | 8/1968 | Donald | 425/133.5 |
| 3,464,087 | 9/1969 | Koch | 425/133.5 |
| 3,608,040 | 9/1971 | Green | 264/176 |
| 3,647,346 | 3/1972 | Minnie | 425/466 |
| 3,684,422 | 8/1972 | Huesing | 425/466 |
| 3,706,518 | 12/1972 | Bunte et al. | 425/466 |
| 3,754,847 | 8/1973 | Sawada et al. | 425/133.5 |
| 3,832,120 | 8/1974 | Shaffer | 425/466 |
| 3,859,031 | 1/1975 | Hawkins | 425/461 |
| 3,893,410 | 7/1975 | Herzhoff et al. | 118/412 |
| 3,903,843 | 9/1975 | Jones | 118/412 |
| 3,966,381 | 6/1976 | Suh | 425/376 |
| 4,043,739 | 8/1977 | Appel | 425/461 |
| 4,189,293 | 2/1980 | Ether | 425/376 |
| 4,259,055 | 3/1981 | O'Brien | 425/376 |
| 4,293,517 | 10/1981 | Knox | 264/176 |
| 4,316,868 | 2/1982 | Esposito et al. | 264/171 |
| 4,411,614 | 10/1983 | Feathers | 425/466 |
| 4,789,513 | 12/1988 | Cloeren | 264/171 |
| 4,828,779 | 5/1989 | Hiraki et al. | 264/171 |

FOREIGN PATENT DOCUMENTS

| | | |
|---|---|---|
| 0461365A1 | 12/1991 | European Pat. Off. . |
| 0464790A1 | 1/1992 | European Pat. Off. . |
| 3503721A1 | 8/1986 | Fed. Rep. of Germany . |
| 45-37873 | 1/1970 | Japan .................... 425/461 |
| 51-15874 | 5/1976 | Japan .................... 425/382.4 |
| 53-132060 | 11/1978 | Japan .................... 425/376.1 |
| 56-129137 | 10/1981 | Japan .................... 425/466 |
| 59-229330 | 12/1984 | Japan .................... 425/461 |
| 61-167523 | 7/1986 | Japan .................... 425/466 |
| 113660 | 4/1967 | Netherlands . |
| 493363 | 11/1975 | U.S.S.R. .................... 425/382.4 |
| 890138 | 2/1962 | United Kingdom .......... 425/376.1 |
| 2092512 | 8/1982 | United Kingdom .......... 425/466 |
| 2114050 | 8/1983 | United Kingdom .......... 425/461 |
| 2154932A | 9/1985 | United Kingdom . |
| 2154932B | 4/1987 | United Kingdom . |

*Primary Examiner*—Scott Bushey
*Attorney, Agent, or Firm*—Carl F. Ruoff; Charles E. Snee, III

[57] ABSTRACT

Dies are disclosed for forming sheet-like extrudate of fluent material, such as a film of thermoplastic or solvent-plasticized material, or a liquid coating, e.g. a photographic coating, on a continuous support web. The dies include inner and outer cavities with the fluent material being supplied to the center or an end of the inner cavity. Between the inner and outer cavities there is an inner slot and between the outer cavity and the exterior of the die there is an outer slot. The inner cavity is open at one end, if end fed, or at both ends, if center fed. The open end, or each open end, is closed by closing means which are detachable for allowing access to the inner cavity for cleaning and inspection. A member is located in the cavity extending from the open end or each open end. The member serves to reduce the effective flow path for fluent material in the inner cavity. By appropriate selection of the shape of the member, uniform flow rates of fluent material through portions of the inner slot adjacent the member may be achieved. By providing a plurality of interchangeable differently shaped members, a plurality of different combinations of rheologies and flow rates of fluent material may be extruded while maintaining uniformity of widthwise thickness uniformity of the extrudate. The invention is also applicable in embodiments in which there is only a single cavity and a single slot.

9 Claims, 7 Drawing Sheets

DIES

BACKGROUND OF THE INVENTION

This invention relates to dies for forming a sheet-like extrudate of fluent material.

Dies for forming sheet-like extrudates of fluent material are known and examples are found in the arts of forming films of thermoplastic or solvent-plasticized film and in the art of coating, for example the coating of layers of photographic materials onto a continuous substrate, such as a web of cellulose triacetate, polyethylene terephthalate or paper.

Figure 1:
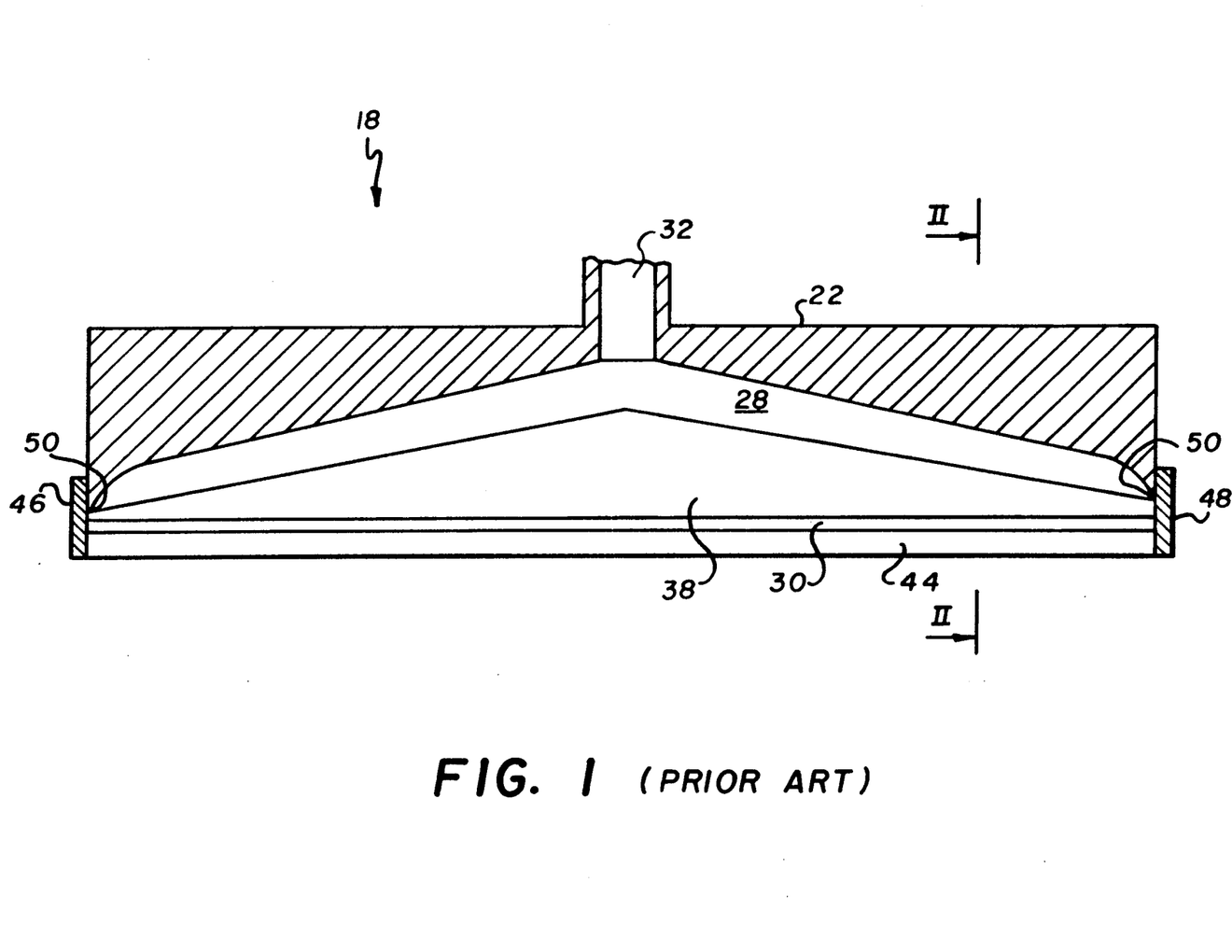
FIG. 1 is a cross-sectional view of a die according to the prior art, the plane of the cross-section being parallel to the widths of the cavities and slots and taken as shown at I—I in FIG. 2.
Figure 2:
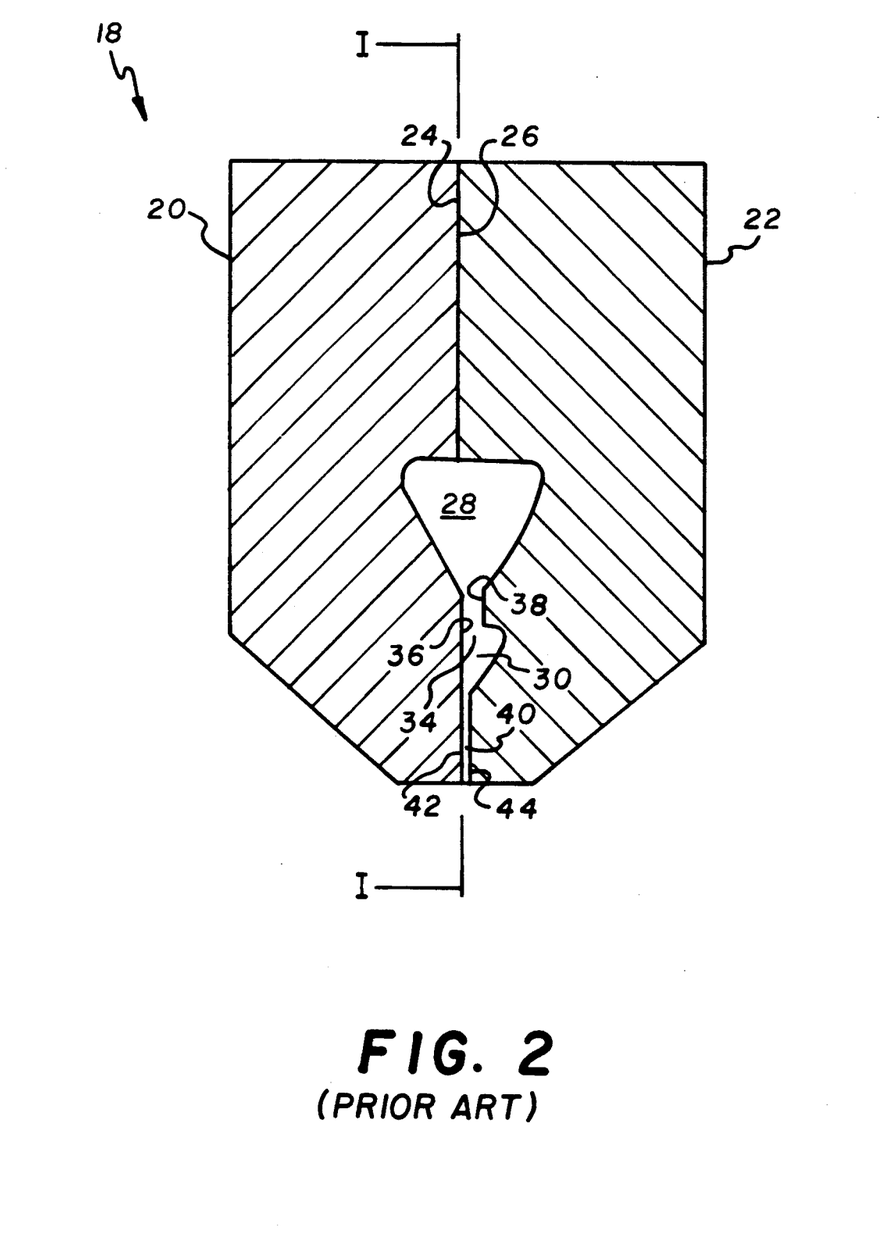
FIG. 2 is a cross-section of the die illustrated in FIG. 1, taken on the line II—II in FIG. 1.

Such dies form a continuous flow of the fluent material along a duct into a sheet. In many applications it is very important that the sheet has uniform thickness not only along its length but also across its width. Much attention has been given to achieving widthwise thickness uniformity. FIGS. 1 and 2 of the accompanying drawings diagrammatically represent a known die 18 for extruding a sheet-like film of thermoplastic material. Only a few details of the die will now be described because the die is well known. The die body is formed of two die halves 20 and 22 secured together by means which are not shown. The die halves 20 and 22 contact one another at lands 24 and 26. The die is of the type known as a coat-hanger die and includes inner and outer cavities 28 and 30 respectively. Fluent material is supplied to the inner cavity 28 through a feed duct 32 located at the middle of the width of the die 18. The fluent material flows in both directions along the inner cavity, away from the duct 32. The fluent material which has spread throughout the inner cavity flows from the inner cavity 28 to the outer cavity 30 through a slot 34, sometimes termed the inner slot, which is formed between two spaced surfaces 36 and 38 of the two die halves 20, 22, respectively. The terms length, height and width will be used herein in relation to cavities and slots. It is to be understood that the term length is used in respect of dimensions parallel to the direction of flow of fluent material through the slots. The term height is used in relation to dimensions perpendicular to the parallel surfaces which bound the inner slot. The term width is used in respect of the dimension orthogonal to the length and height dimensions which are, of course, orthogonal to one another. The length of the slot 34 decreases with increasing distance from the location where the feed duct 32 opens into the cavity 28. The slot 34 discharges into the outer cavity 30. An outer slot 40 extends from the outer cavity 30 to the exterior of the die 18. The outer slot 40 is bounded by surfaces 42 and 44 of the die halves 20 and 22, respectively.

The outer cavity 30 is of uniform cross-sectional shape and area throughout its width dimension. The outer cavity 30 is formed by machining into only the die half 22 whereas the inner cavity 28 is formed by machining into both die halves 20 and 22, as may be seen in FIG. 2.

The outer slot 40 has uniform length throughout its width.

End plates 46 and 48 are secured to the ends of the die halves 20 and 22, as may be seen in FIG. 1. The end plates 46, 48 serve to close the ends of the inner and outer slots and the outer cavity and any small opening the inner cavity may have at its ends. With the tapering cross-sectional area of the inner cavity, associated with its known coat-hanger form, the cross-sectional area of the inner cavity decreases to zero or near zero at both of its ends, as may be seen at reference numerals 50 in FIG. 1. Thus, even when the end plates have been removed, the inner cavity is not accessible for cleaning and inspection.

As is known, the purpose of the coat-hanger form of the inner cavity 28 and of the tapered inner slot 34, is to give the sheet-like film which is extruded from the outer slot 40 uniform thickness across its entire width and yet maintain high wall shear stress throughout the width of the inner cavity and relatively low residence time and fast purging of fluent material. As is well known, the coat-hanger die has achieved a certain measure of success at rendering the thickness of the extruded film uniform but it has certain limitations which will now be considered.

Firstly, in that any one particular pair of inner cavity and inner slot is designed to optimize the thickness uniformity of the extruded film for one fluent material and one flow rate of that one fluent material or for other equivalent combinations of fluent material and flow rate, the die is dedicated to that one material and that one flow rate. Other materials, with other rheologies, and other flow rates will produce a film lacking widthwise thickness uniformity. This is a significant problem because it means that if near-perfect widthwise thickness uniformity is essential, a manufacturer must have available for use as many different dies as there are different combinations of materials and flow rates which it is desired to use in production, or the manufacturer must accept a degree of widthwise non-uniformity of thickness in order to avoid purchasing an excessive number of dies.

Secondly, the inner cavity is not accessible for cleaning and inspection merely by removing the end plates 46, 48. This is because the cross-sectional area of the inner cavity has tapered to zero or near zero at the ends of the die body. Thus, in order to clean and inspect the inner cavity 28, the two die halves have to be split apart, which, as is known to those skilled in the art, is a major operation because it entails, inter alia, during reassembly, securing the two die halves together in a manner which gives the outer slot 40 uniformity of height throughout its width.

It is an object of the present invention to overcome the above-described problems.

SUMMARY OF THE INVENTION

According to the present invention the problems of the prior art are overcome by providing a die for forming a sheet-like extrudate of fluent material which includes a die body with an elongate cavity in the body. An end of the cavity is open at the exterior of the body. There are means for conducting fluent material to the cavity and a parallel-sided slot extends from the cavity for passage of fluent material form the cavity towards the exterior of the body. Closing means are detachably connected to the die body and are adapted to close the open end of the cavity. A member is mounted in the cavity and extends at least part-way along the cavity from the end closed by the closing means. The member and the cavity are so formed and the member is so positioned in the cavity that the rates of flow of fluent materials through portions of the cavity having their upstream ends adjacent the member are substantially uniform. The closing means is detachable from the die body and the member is withdrawable from the cavity for allowing access to the cavity. Thus, by detaching the closing means, access to the cavity is gained for cleaning and inspecting the cavity. Furthermore, by withdrawing the member, another member of different configuration and/or position within the cavity, may be inserted into the cavity whereby widthwise uniformity of the extruded material may be achieved for a different fluent material and/or flow rate. Thus, the present invention allows a manufacturer to have only one die body and a plurality of different members, but be able to produce sheet-like extrudates of different materials and-/or flow rates with a high degree of widthwise thickness uniformity.

DESCRIPTION OF THE PREFERRED EMBODIMENT

Figure 3:
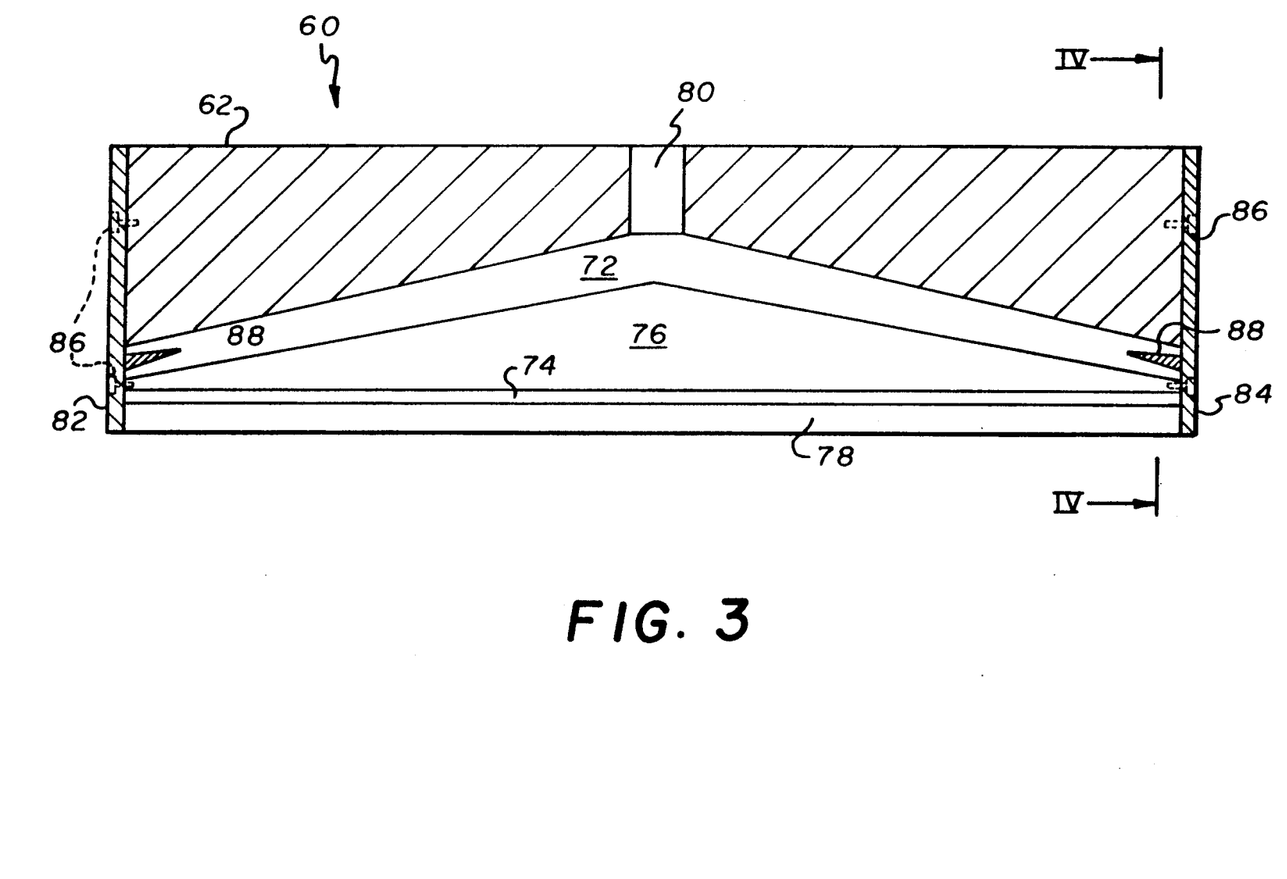
FIG. 3 is a view, similar to that of FIG. 1, but of a first embodiment of the present invention, the cross-section being taken on the line III—III in FIG. 4.
Figure 4:
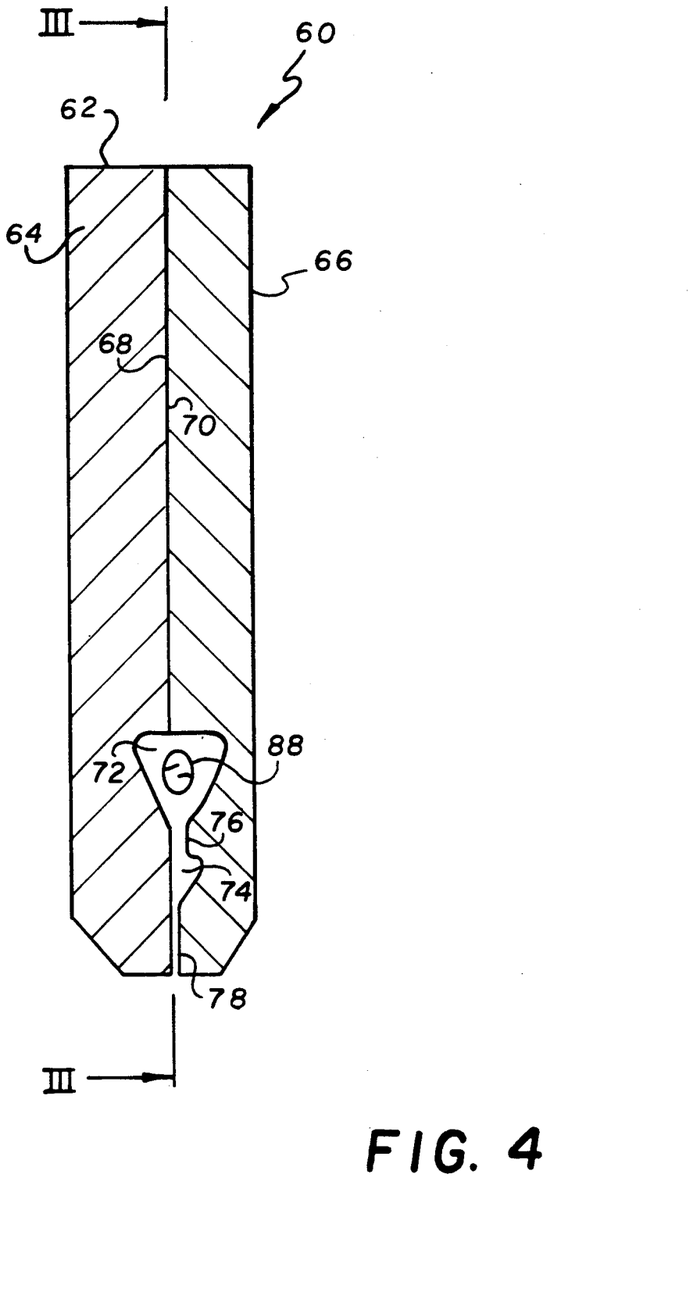
FIG. 4 is a view similar to that of FIG. 2 but of the first embodiment of the present invention illustrated in FIG. 3, the cross-section being taken on the line IV—IV in FIG. 3.

In FIGS. 3 and 4 of the accompanying drawings there is illustrated a first embodiment of the present invention. Only such description of the die illustrated in FIGS. 3 and 4 will now be given as is necessary to understand the present invention. It is to be understood that structure and features not described may be drawn from the art.

In FIGS. 3 and 4 there is illustrated a die 60 comprising a die body 62 formed of two die halves 64 and 66, respectively. The two die halves are secured together by means (not shown) well known in the art. The two die halves 64 and 66 contact one another at lands 68 and 70, respectively (see FIG. 4).

The die body 62 has inner and outer cavities 72 and 74, respectively, and an inner slot 76 providing for flow of material to be extruded, from the inner to the outer cavity, that is, towards the exterior of the die. An outer slot 78 provides communication between the outer cavity 74 and the exterior of the die body 62 and is the passage by which the fluent material extrudate leaves the die body 62.

A duct 80 is provided for supply of fluent material to the center of the inner cavity. Because of the position of the feed to the inner cavity, the die is of a type often termed center feed.

The length of the inner slot 76 decreases as the distance away from the middle of the width (that is, the point of feed to the inner cavity) of the die body increases, for reasons which are well known and will not be described herein. In the present embodiment the reduction in length is linear. The downstream end of the inner slot is rectilinear. Because the inner cavity is disposed at the upstream end of the inner slot 76 and because the inner slot has a length which decreases with distance away from the middle of the die body, the axis of the inner cavity (that is, a line parallel to the width dimension of the die body) is not rectilinear; rather it is bent in the manner of a coat hanger as may be seen in FIG. 3. As may be seen in FIG. 4, the inner cavity 72 has a cross-sectional shape approximating an equilateral triangle with the apex of the triangle being at the upstream end of the inner slot 76. The cross sectional area of the inner cavity decreases somewhat from the location where the duct 80 enters the cavity 72 but it does not decrease to substantially zero at the ends as does the cavity of the prior art illustrated in and described with reference to FIGS. 1 and 2.

The ends of the outer cavity 74 as well as the ends of the inner and outer slots 76 and 78 are open at the ends of the die body 62. The open ends of the inner and outer cavities 72 and 74 and of the inner and outer slots 76 and 78 are closed by closing means in the form of end plates 82 and 84 which are secured to the die body halves 64 and 66 by means diagrammatically illustrated as bolts 86. Removal of the end plates 82, 84 allows access to the inner cavity for cleaning and inspection purposes. For example, a cleaning brush may be inserted through the open ends of the inner cavity to clean the cavity throughout its length and, for inspection, the eye may be placed at the open ends of the cavity, in succession. This manner of cleaning is economically superior to the manner of cleaning necessary with the prior art die illustrated in FIGS. 1 and 2 which required that the two die halves be separated from one another and subsequently reassembled.

In the prior art die illustrated in FIGS. 1 and 2, the cross-sectional area of the inner cavity decreases from adjacent the feed, for the major portion of the distance to the ends. Near the ends of the inner cavity the cross-sectional area of the cavity decreases to nearly zero. The non-linear decrease in cross-sectional area adjacent the ends of the cavity is to provide constant pressure drop even near the ends where the reduction in flow axially of the cavity changes geometrically.

In the embodiment of the present invention presently being described, it is desirable, as with the prior art, to provide constant pressure drop throughout the length of the inner cavity. This is achieved by decreasing the cross-sectional area from the duct inlet to the ends of the inner cavity and providing for the rapid decrease in effective cross-sectional area adjacent the ends. The rapid effective decrease in cross-sectional area adjacent each end is created by a member 88 disposed in each end portion of the cavity 72. Each member 88 is shown as having conical form but may have any shape necessary to provide the constant pressure drop in the end portions of the inner cavity.

In the present embodiment, the members are secured, as by welding, to the end plates 82, 84, however, in other embodiments, the members may be secured directly to one or both of the die body halves or they may have enlarged bases which sit in recesses in the die body halves with the bases being trapped in the recesses by the end plates. Other means of mounting the members will occur to those skilled in the art.

The shape of the member 88 is calculated by use of the relationship:

$$\Delta P = 2 \times Q \times 1.45 \times 10^{-5} \times \mu \times L \times \frac{B^2}{A^3}$$

wherein $A = A_1 - A_2$ $B = B_1 + B_2$ and $A_1$ = cross sectional area of the inner cavity at a point, (sq. in.);
$A_2$ = cross sectional area of the member 88 at the same point (sq. in.);
$B_1$ = perimeter of the cavity in a transverse plane including the same point, (in.);
$B_2$ = perimeter of the member in the same plane (in.);
$Q$ = volumetric flow rate in the cavity through the same plane (cu. in./sec.):
$\mu$ = viscosity (poise);
$L$ = incremental length along cavity and member at the same point (in.); and
$\Delta P$ = pressure drop over length L (psi).

It has been found that the pressure drop is affected not only by the shape of the member and the shape of the portion of the cavity within which the member is located, which two shapes together define the effective area of the path for flow of fluent material at any location along the cavity, but also by the positioning of the member 88 within the cavity. Thus, it is not only the area of the effective flow path but also the shape of the effective flow path and its relationship to the upstream end of the inner slot, which affects the pressure drop. The effect of positioning of the member 88 may be determined empirically or mathematically as will be apparent to those skilled in the art. In the present embodiment, the conical member 88 is positioned with its axis on the geometric axis of the substantially triangular shape of the cavity.

The relationship provided above for use in determining the shape of the members 88 is appropriate for Newtonian fluent material and viscous flows. It will be apparent to those skilled in the art that a modified relationship exists for non-Newtonian fluent materials.

The member 88 is one of a plurality of different members having differing shapes and/or lengths and/or positions in the cavity. Such a range allows one die body to be used for many different fluent materials and many different flow rates while still providing widthwise thickness uniformity. Each of the members is secured to an end plate or has other means for securing it to the die body, as the design of the die body dictates.

Figure 5:
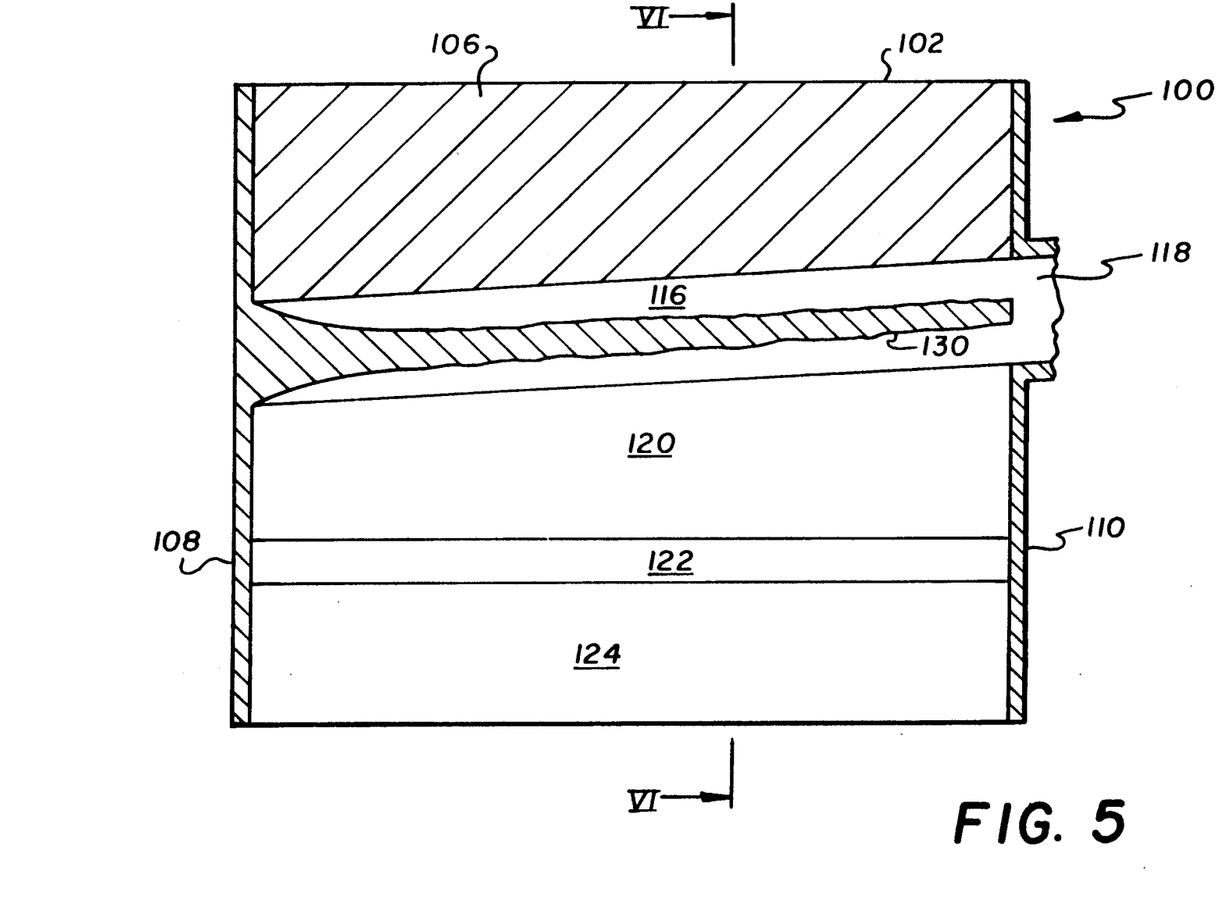
FIG. 5 is a view, similar to that of FIG. 3, but of a second embodiment of the present invention.
Figure 6:
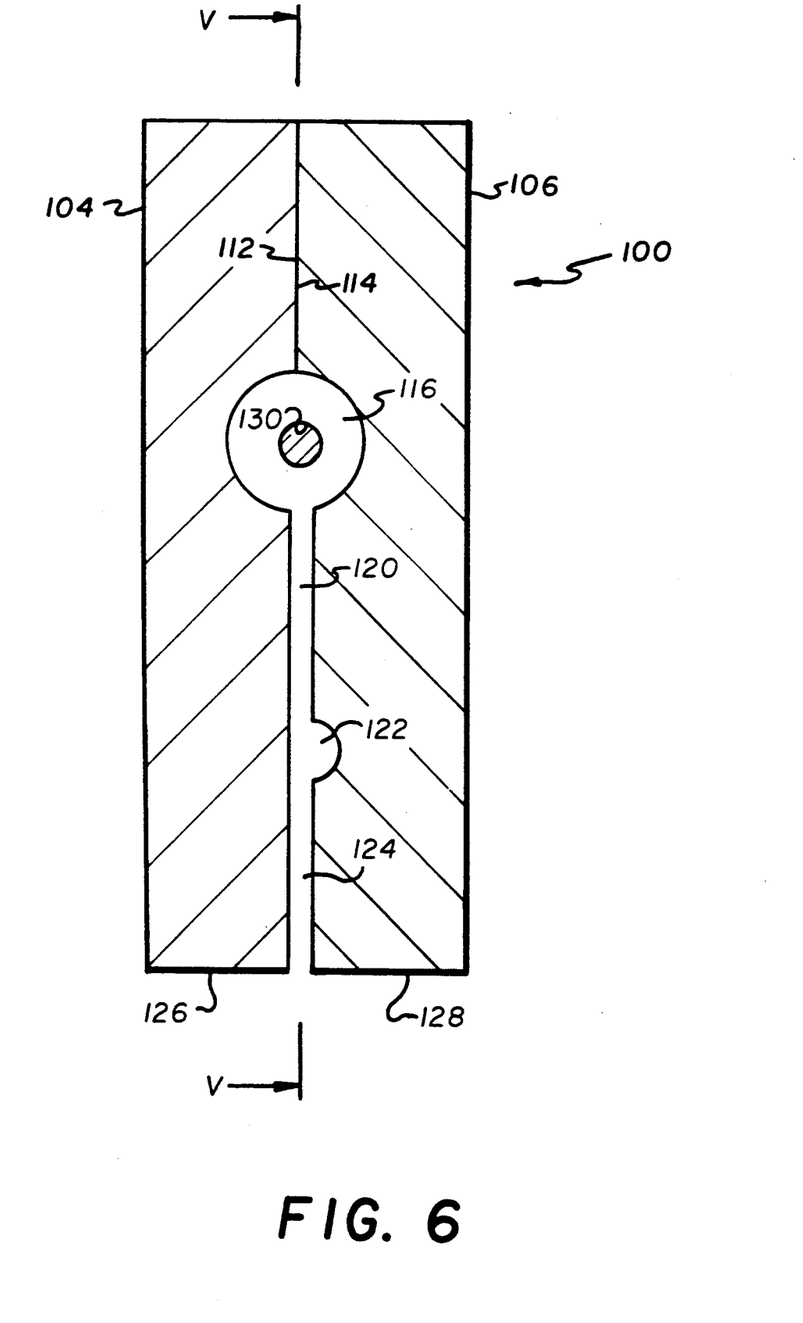
FIG. 6 is a view similar to that of FIG. 4, but of the second embodiment illustrated in FIG. 5.

A second embodiment of the present invention is illustrated in FIGS. 5 and 6. This second embodiment was designed for use in coating photographic materials onto a continuous web of paper, cellulose acetate or polyethylene terephthalate, for example. As such, the die of this second embodiment is often called a hopper and may be used, for example, in bead coating, curtain coating or extrusion coating.

The die 100 illustrated in FIGS. 5 and 6 includes a die body 102 including first and second die halves 104 and 106, respectively and first and second end plates 108 and 110, respectively. The two die halves 104 and 106 are in contact at lands 112 and 114 and are secured together by means (not shown) well known in the art. The die body 102 further includes a first, inner cavity 116. In this embodiment, the inner cavity is circular cylindrical, that is, it does not taper. Also, the die of this second embodiment, is end fed rather than center fed as was the die of the first embodiment. In FIG. 5 there is illustrated a duct 118 integral with the end plate 110 and aligned with the adjacent end of the inner cavity 116 for feeding fluent material, to be extruded, to the inner cavity.

An inner slot 120 leads from the inner cavity 116 to an outer cavity 122, that is, towards the exterior of the die. An outer slot leads from the outer cavity to the exterior of the die body 102. As is known to those skilled in the art, if the die is used as part of a slide hopper in bead or curtain coating, the die would be inverted from the orientation in which it is illustrated in FIGS. 5 and 6 and the surfaces 126 and 128 at either side of the outer slot 124 would be inclined so that the fluent material exiting the outer slot in sheet-like form would change direction and slide down that one of the surfaces 126 and 128 which is inclined downwardly away from the slot 124.

The length of the slot 120 decreases as the distance away from the feed duct 118 increases. The outer slot is of uniform length and height throughout its width. In other embodiments the height and/or length could vary. The outer cavity is of uniform cross-sectional area and shape throughout its width, that is, along its long dimension. Hereagain, these parameters could vary in other embodiments.

The end plate 108 serves to close the inner and outer cavities and the inner and outer slots at one end of each. The end plate 110 serves to close the other end of each of the inner and outer slots and the outer cavity.

Disposed within the inner cavity 116 is a member 130 which, in the present embodiment, extends throughout the length of the inner cavity. At one end the member is secured, as by welding, to the end plate 108 so as, essentially, to be integral therewith.

Those skilled in the art would recognize that there are benefits in relation to manufacturing the die to be gained with a non-tapering inner cavity. However, absent the member but with the inner cavity being non tapering and even though the inner slot is of decreasing length as the distance from the feed duct 118 increases, the die designer is presented with a dilemma. If an inner cavity is designed having a small enough cross-sectional area such that high residence times, poor purging and areas of stagnation, with resultant fouling, are alleviated, the die will not provide a high degree of widthwise thickness uniformity of coatings for a wide range of rheologies and flow rates. In the photographic industry, a very high degree of widthwise thickness uniformity is needed otherwise a strip of film or a sheet of print paper, for example, taken from adjacent a margin of a master roll would not have the same photographic response as one taken, say, from the center of the width of the master roll. Such unpredictability of the photographic response would, in extreme cases, be unacceptable. Tapering the inner cavity further alleviates high residence times and poor purging, but still has the problem of poor versatility, that is, the ability to accomodate a range of rheologies and flow rates.

However, with an appropriate member 130 in the inner cavity 116, serving to reduce the effective cross sectional area of the cavity progressively away from the feed duct 118, widthwise thickness uniformity can be achieved for different rheologies and flow rates. Furthermore, as in the previously herein described embodiment, the member 130, with its integral end plate 108, is interchangeable with other member and end plate units of differing member shape and/or position. Thus, here again, the one die body can be used, with different members, to produce good widthwise thickness uniformity when extruding differing fluent materials and differing flow rates. Those skilled in the art will recognize that a substantial capital investment on a plurality of differing dies is avoided by adoption of the present invention which requires only an inventory of differing members with a single die body. Again, in this embodiment, the inner cavity can be cleaned and inspected by releasing the end plate 108 from the die body 102 and withdrawing the member 130 from the inner cavity 116. Such a procedure avoids dismantling the entire die body which would necessitate reassembling of the die body and the lengthy but essential task of ensuring the uniformity of the height of the outer slot 124 during reassembly. Also, the cross-sectional area of the cavity can be kept small enough to promote good purging and low residence times and to eliminate areas of stagnation.

The shape of the member 130 for a Newtonian fluent material under viscous flow, may be determined by the following analysis, in which:

$Q_o$ = rate of flow of fluent material into cavity 116 from duct 118 (cu. in./sec.);

R = radius of cavity 116 (in.);

r = radius of member 130 (a function of distance along the cavity from the feed duct)(in.);

$Q_x$ = rate of flow in direction along the cavity (cu.in./sec.) (a function of distance along the cavity);

$Q_y$ = rate of flow in slot in direction parallel to its length (cu.in./sec.);

$$q_y = \frac{Q_y}{W};$$

W = width of the slot 120 (in.);

$L_s$ = length of slot (function of distance along the cavity)(in.);

$$\alpha = \frac{r(x)}{R} \text{ (function of distance } x \text{ along the cavity);}$$

B = one-half the slot height (constant) (inches); and $$x^* = \frac{x}{W}.$$

The pressure drop through the length of a slot is known to be $$P_{cav} - P_{atm} = \Delta P = \frac{3/2\mu \, Q_y L_s}{B^3 \, W} \quad (1)$$

wherein:

$P_{cav}$ = pressure in the cavity;

$P_{atm}$ = atmospheric pressure at the exit of the outer slot; or $$P_{cav} - P_{atm} = \frac{3/2\mu \, L_s}{B^3} q_y. \quad (2)$$

The pressure drop through the effective portion of the cavity (i.e. the portion around the member) can be written as:

$$\frac{d P_{cav}}{dx} = - \frac{8\mu \, Q_x}{\pi R^4} \frac{1}{f(x)} \quad (3)$$

wherein $$f(x) = (1 - \alpha^4) - \frac{(1 - \alpha^2)^2}{\ln(1/\alpha)}. \quad (4)$$

In the above, f(x) is explicit for an annular space around the member. If a different shape of space between the member and the cavity wall is adopted (e.g. sector, ellipse, et al) f(x) is changed.

For other geometries for which no analytical solution exists, the pressure drop/flow rate relationship belonging to the shape of the space between the member and the cavity wall may be determined numerically as shown by Ta-Jo Liu in a paper entitled "Fully Developed Flow of Power-Law fluid in Ducts" to the American Chemical Society in 1983 and in his paper entitled "The Pressure Drop/Flow Rate Equation for Non-Newtonian Flow in Channels of Irregular Cross-Section" published in the Mid-December, 1988, vol. 28, no. 23, edition of Polymer Engineering and Science.

Note that f(x) defines the taper of the member

Differentiating Equation (1) with respect to x (the distance along the cavity) gives:

$$\frac{d P_{cav}}{dx} = \frac{3/2\mu}{B^3} \left( \frac{dq_y}{dx} L_s + q_y \frac{dL_s}{dx} \right). \quad (5)$$

Setting Equation (3) equal to Equation (5) gives:

$$-\frac{8\mu \, Q_x}{\pi R^4} \frac{1}{f(x)} = \frac{3/2\mu}{B^3} \left( \frac{dq_y}{dx} L_s + q_y \frac{dL_s}{dx} \right). \quad (6)$$

Making a material balance on a differential of the slot, wherein, $dQ_y$ is the incremental flow into the slot out of an incremental length dx $$Q_x = Q_x + \frac{dQ_x}{dx} dx + dQ_y$$

$$dQ_y = -dQ_x = q_y(x) \, dx$$

$$q_y(x) = -\frac{dQ_x}{dx} \quad (7)$$

Substituting Equation (7) into Equation (6)

$$\frac{-8Q_x}{\pi R^4} \frac{1}{f(x)} = \frac{3/2}{B^3} \left[ L_s \frac{d}{dx} \left( \frac{-dQ_x}{dx} \right) - \frac{dQ_x}{dx} \frac{dL_s}{dx} \right] \frac{d^2 Q_x}{dx^{*2}} + \frac{dL_s/dx^*}{L_s} \frac{dQ_x}{dx^*} - \frac{16 B^3 W^2}{3 L_s \pi R^4} \frac{1}{f(x^*)} Q_x = 0 \quad (8)$$

Wherein $x^* = x/W$.

Here, the distribution for a given die and member may be determined by discretizing Equation (8) and solving numerically.

To design a member (define its taper, f(x)), make the substitution $Q_x = Q_o(1 - x^*)$ into Equation (8) and solve for f(x)

The result is:

$$f(x) = \frac{16B^3W^3}{(dL_s/dx)\pi R^4} (1 - x^*).$$

Once f(x) is known, the radius of the implant may be found implicitly.

Figure 7:
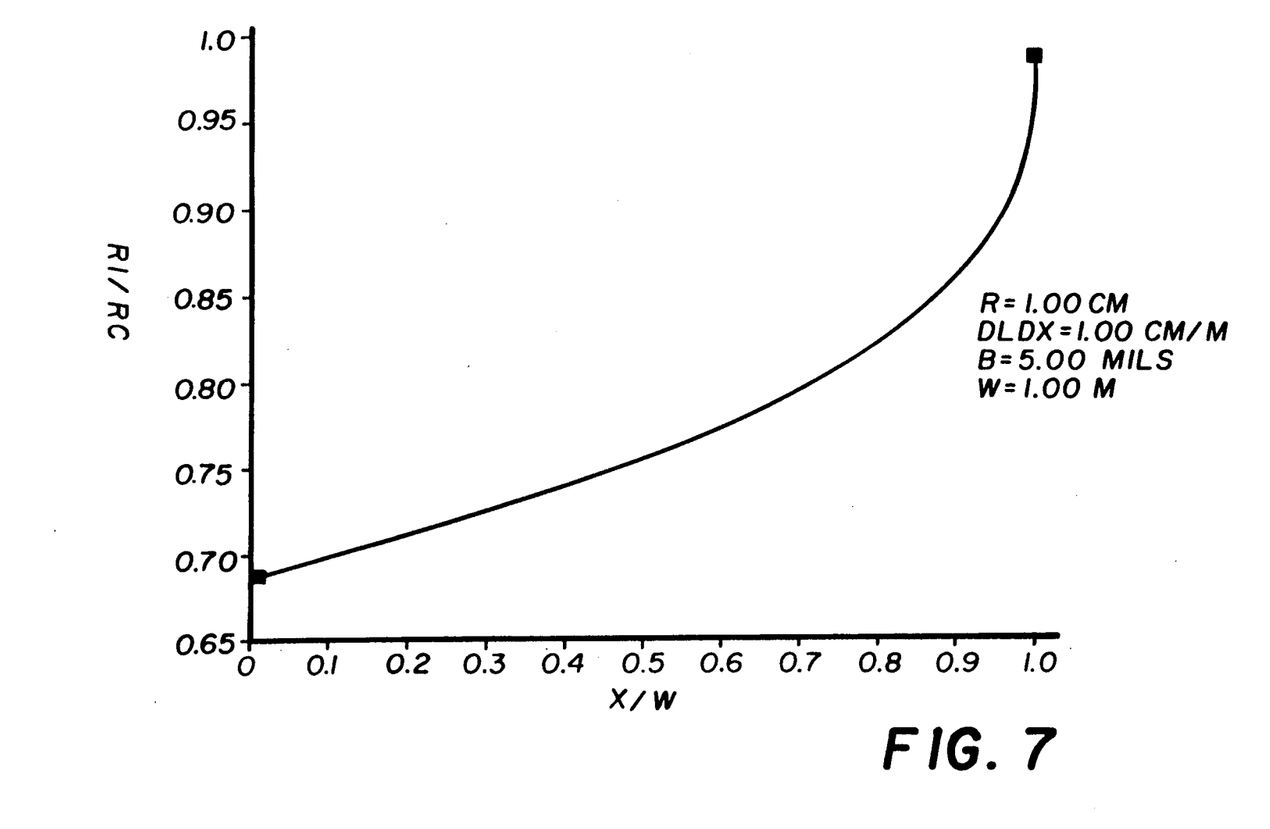
FIG. 7 is a plot showing the relationship of some parameters of a specific embodiment.

FIG. 7 is a plot of alpha (radius of member at distance x from inlet end of the cavity, divided by the radius of the cavity) against x/w (distance along the cavity from the feed end divided by the width of the slot), for a die in which:

the radius R of the cavity is 1.00 cm;
$dL_s/dx = -1.0$ cm/m;
$B = 5.00$ mils; and
$W = 1.00$ m.

The analysis above is valid only for Newtonian viscous flows. The viscous Newtonian example is given here because of its simplicity. The analysis can easily be extended to include non-Newtonian effects by replacing the pressure drop/flow rate relationships in Equations (1) and (3) with the appropriate relationships drawn from the above-referenced Liu papers and from "Dynamics of Polymeric Liquids; Vol. 1 Fluid Mechanics" by R. B. Bird, R. C. Armstrong and D. Hassager, published in New York in 1987 by Wiley.

The present invention may be adapted to provide a yet further advantage. As is known to those skilled in the art, it may be desirable to vary the width of the extruded sheet-like material from one run to another. Deckles are known for reducing the width of the outer slot and, thereby, the width of the extrudate. Deckles may take the form, for example, of rods sliding along the entry and/or exit of the outer slot. However, the mere reduction of the effective width of the outer slot, while serving to adjust the width of the extrudate, introduces the problem of widthwise thickness non-uniformity in the margins of the extrudate. This problem occurs because the reducing effective flow path in the inner cavity adjacent the ends of the cavity is, with the reduced effective width of the outer slot, no longer appropriate. However, by using appropriately configured members according to the present invention, the one die body may be used for producing a range of different widths of extrudate merely by using appropriate deckles to reduce the effective width of the outer slot and members 88 having configurations appropriate for the deckels selected. In this way a range of different widths of extruded sheet-like material may be produced having good widthwise thickness uniformity, while using the one die body.

It is to be understood that other forms of outer cavity and slot may be adopted in other embodiments of the present invention. The forms of the outer cavity and outer slot are not material to the present invention. In the embodiments of the present invention described above there are two cavities and two slots. It is to be understood that the invention may also be embodied in dies in which there is only a single cavity and, hence, also only a single slot, leading from the single cavity to the exterior of the die.

Embodiments of the invention have been described, by way of example. It is to be understood that changes and modifications can be made within the spirit and scope of the appended claims.

What is claimed is:

1. In a die for forming an extruded sheet of fluent material, said die being of a type including a die body having two separable die halves; an elongate cavity within said die body, said cavity being enclosed by said separable die halves and said cavity having an open end at a lateral surface of said die body; means for supplying fluent material into said cavity at a location spaced from said open end; an elongate slot within said die body, said slot being enclosed by said separable die halves and extending from said cavity toward an exterior of said die body, said elongate slot having a length in the direction of flow of fluent material which decreases with increasing distance from said means for supplying toward said open end; and means, detachably mounted to said die body, for selectively opening or closing said open end, the improvement comprising:

a stationary member, extending at least part way along said elongate cavity adjacent said elongate slot from said open end toward said means for supplying, said member having a geometry for progressively decreasing an open cross-sectional area for flow of fluent material through said cavity, the decrease being in a direction from said means for supplying toward said open end, said member being sized for insertion into and removal from said elongate cavity through said open end and said decreasing open cross-sectional area being such that flow rates of fluent material are substantially uniform through portions of said elongate slot having their upstream ends adjacent said decreasing cross-sectional area;

whereby, upon detachment of said means for selectively opening or closing said open end, said member is removable from said elongate cavity through said open end to permit access to said elongate cavity while said separable die halves remain assembled as said die body.

2. A die as claimed in claim 1, wherein said means for selectively opening and closing said open end and said member are formed as a unit.

3. A die as claimed in claim 1, wherein said means for selectively opening and closing said open end and said member are formed as a unit and said unit is one of a plurality of such units, the units being similar in that they are each detachably mountable to said die body to selectively open or close said open end and the units being different in that their respective members are different in shape or length, whereby by appropriate selection from said plurality of units uniformity of flow rates is achievable with fluent materials having different characteristics.

4. A die as claimed in claim 1, wherein said die further includes a second cavity at the downstream end of said elongate slot, and a second elongate slot leading from said second cavity to the exterior of said die body.

5. A die as claimed in claim 1, wherein said means for supplying fluent material discharges fluent material into the center of said elongate cavity.

6. A die as claimed in claim 5, wherein the cross-sectional area of said elongate cavity decreases as the distance increases from said means for supplying.

7. A die as claimed in claim 1, wherein the cross-sectional area of said elongate cavity decreases as the distance increases from said means for supplying.

8. A die as claimed in claim 1, wherein said elongate cavity is open at two ends and a member is mounted at both open ends.

9. A die as claimed in claim 1, wherein said member is one of a plurality of such members, the individual members being similar in that they are each insertable into said elongate cavity and the individual members being of different shape or length whereby by appropriate selection form said plurality of members uniformity of flow rates is achievable with fluent materials having different characteristics.

* * * * *